US011161603B2

(12) United States Patent
Vallart et al.

(10) Patent No.: US 11,161,603 B2
(45) Date of Patent: Nov. 2, 2021

(54) ARCHITECTURE FOR A PROPULSION SYSTEM OF A HELICOPTER INCLUDING A HYBRID TURBOSHAFT ENGINE AND A SYSTEM FOR REACTIVATING SAID HYBRID TURBOSHAFT ENGINE

(71) Applicants: SAFRAN HELICOPTER ENGINES, Bordes (FR); SAFRAN ELECTRICAL & POWER, Blagnac (FR)

(72) Inventors: Philippe Vallart, Gan (FR); Jean-Michel Bazet, Gelos (FR); Loïc Le Duigou, Montrouge (FR)

(73) Assignees: SAFRAN HELICOPTER ENGINES, Bordes (FR); SAFRAN ELECTRICAL & POWER, Blagnac (FR)

( * ) Notice: Subject to any disclaimer, the term of this patent is extended or adjusted under 35 U.S.C. 154(b) by 214 days.

(21) Appl. No.: 15/517,924

(22) PCT Filed: Oct. 6, 2015

(86) PCT No.: PCT/FR2015/052683
§ 371 (c)(1),
(2) Date: Apr. 7, 2017

(87) PCT Pub. No.: WO2016/059320
PCT Pub. Date: Apr. 21, 2016

(65) Prior Publication Data
US 2017/0305541 A1    Oct. 26, 2017

(30) Foreign Application Priority Data
Oct. 13, 2014 (FR) .................................. 1459777

(51) Int. Cl.
B64C 27/14    (2006.01)
F01D 13/00   (2006.01)
(Continued)

(52) U.S. Cl.
CPC .............. *B64C 27/14* (2013.01); *B64D 27/24* (2013.01); *F01D 13/00* (2013.01); *F01D 13/003* (2013.01);
(Continued)

(58) Field of Classification Search
CPC ........ B64C 27/14; B64D 35/02; B64D 35/08; B64D 2027/026; F02C 7/26; F02C 7/262;
(Continued)

(56) References Cited

U.S. PATENT DOCUMENTS 4,276,743 A * 7/1981 LaGrone ................... F02C 7/26
60/39.281
5,152,141 A * 10/1992 Rumford ................ B64D 41/00
60/778

(Continued)

FOREIGN PATENT DOCUMENTS

| EP | 2 404 775 A2 | 1/2012 |
| FR | 3 003 514 A1 | 9/2014 |
| WO | 2012/059671 A2 | 5/2012 |

OTHER PUBLICATIONS

International Search Report dated Jan. 28, 2016, issued in corresponding International Application No. PCT/FR2015/052683, filed Oct. 6, 2015, 2 pages.

*Primary Examiner* — Craig Kim
(74) *Attorney, Agent, or Firm* — Christensen O'Connor Johnson Kindness PLLC

(57) ABSTRACT

The invention relates to an architecture of a propulsion system of a multi-engine helicopter comprising turboshaft engines connected to a power transmission gearbox, characterised in that it comprises: at least one hybrid turboshaft engine (20) capable of operating in at least one standby mode during a stable cruise flight of the helicopter; at least two systems (30; 40) for controlling each hybrid turboshaft engine (20), each system (30; 40) comprising an electric
(Continued)

machine (31; 41) connected to the hybrid turboshaft engine (20) and suitable for rotating the gas generator thereof, and at least one source (33; 43) of electrical power for said electric machine (31; 41), each reactivation system (30; 40) being configured such that it can drive said turboshaft engine (20) in at least one operating mode among a plurality of predetermined modes.

5 Claims, 3 Drawing Sheets

(51) Int. Cl.
*F01D 19/00* (2006.01)
*F02C 7/36* (2006.01)
*B64D 27/24* (2006.01)
*B64D 27/02* (2006.01)
*F02C 7/268* (2006.01)

(52) U.S. Cl.
CPC ........... *F01D 19/00* (2013.01); *F02C 7/36* (2013.01); *B64D 2027/026* (2013.01); *F02C 7/268* (2013.01); *F05D 2220/329* (2013.01); *F05D 2220/76* (2013.01); *F05D 2270/13* (2013.01); *Y02T 50/60* (2013.01)

(58) Field of Classification Search
CPC .......... F02C 7/264; F02C 7/266; F02C 7/268; F02C 7/275; F02C 7/32; F02C 7/36; F02C 9/42; F05D 2220/329; F05D 2260/85; F05D 2270/07; F05D 2270/071; F05D 2270/09; F05D 2270/092; F05D 2270/093
See application file for complete search history.

(56) References Cited

U.S. PATENT DOCUMENTS

| | | | |
|---|---|---|---|
| 8,018,086 B2 * | 9/2011 | Legros | F01D 19/00 307/10.6 |
| 2006/0017328 A1 * | 1/2006 | Bryde | H02J 9/08 307/64 |
| 2008/0211237 A1 * | 9/2008 | Berenger | H02J 3/12 290/40 B |
| 2013/0086919 A1 * | 4/2013 | Dooley | F02C 7/26 60/778 |
| 2013/0219905 A1 * | 8/2013 | Marconi | F02C 6/206 60/772 |
| 2014/0250909 A1 * | 9/2014 | Sowden | F02C 7/266 60/778 |
| 2016/0298486 A1 * | 10/2016 | Langford | F02C 9/46 |

* cited by examiner

ARCHITECTURE FOR A PROPULSION SYSTEM OF A HELICOPTER INCLUDING A HYBRID TURBOSHAFT ENGINE AND A SYSTEM FOR REACTIVATING SAID HYBRID TURBOSHAFT ENGINE

TECHNICAL FIELD

Embodiments of the disclosure relate to an architecture of a propulsion system of a multi-engine helicopter, in particular a twin-engine or three-engine helicopter, and to a helicopter comprising a propulsion system that has such an architecture.

BACKGROUND

As is known, a twin-engine or three-engine helicopter has a propulsion system comprising two or three turboshaft engines, each turboshaft engine comprising a gas generator and a free turbine which is rotated by the gas generator and is rigidly connected to an output shaft. The output shaft of each free turbine is suitable for inducing the movement of a power transmission gearbox, which itself drives the rotor of the helicopter.

It is known that, when the helicopter is in a cruise flight situation (that is, when it is progressing in normal conditions, during all flight phases, except for transitional phases of take-off, ascent, landing or hovering flight), the turboshaft engines develop low levels of power that are below the maximum continuous output thereof. These low levels of power lead to a specific consumption (hereinafter SC), defined as the ratio between the hourly fuel consumption of the combustion chamber of the turboshaft engine and the mechanical power supplied by this turboshaft engine, of approximately 30% greater than the SC of the maximum take-off power, and they therefore lead to an overconsumption of fuel during cruise flight.

Furthermore, the turboshaft engines of a helicopter are designed so as to be oversized in order to be able to keep the helicopter in flight in the event that one of the engines fails. This flight situation arises after the loss of an engine and results in the fact that each operating engine supplies a power level much beyond its nominal power so that the helicopter can cope with a dangerous situation, and then continue its flight.

The turboshaft engines are also oversized in order to be able to ensure flight over the entire flight range specified by the aircraft manufacturer and in particular flight at high altitudes and in hot weather. These flight points, which are highly demanding, particularly when the weight of the helicopter is close to its maximum take-off weight, are encountered only in certain circumstances of use.

These oversized turboshaft engines are disadvantageous in terms of weight and fuel consumption. In order to reduce this consumption during cruise flight, it is envisaged to put at least one of the turboshaft engines on standby during flight. The active engine or engines then operate at higher power levels in order to provide all the necessary power, and therefore at more favourable SC levels.

In applications FR1151717 and FR1359766, the applicants have proposed methods for optimizing the specific consumption of the turboshaft engines of a helicopter through the option of putting at least one turboshaft engine into a stable flight mode, known as a continuous flight mode, and at least one turboshaft engine into a particular standby mode from which it can exit in a rapid or normal manner, as required.

An exit from standby mode is described as "normal" when a change in flight situation requires the activation of the turboshaft engine that is on standby, for example when the helicopter is going to transition from a cruise flight situation to a landing phase. A normal exit from standby of this kind occurs over a period of time between 10 seconds and 1 minute. An exit from standby mode is described as "rapid" when a failure or deficit of power in the active engine occurs or when the flight conditions suddenly become difficult. An emergency exit from standby of this kind occurs over a period of less than 10 seconds.

The applicant has already proposed a system for reactivating the turboshaft engine on standby allowing an exit from standby mode (in a normal or rapid manner) that uses an electric machine. This electric machine can be supplied with power by the onboard network of the helicopter (hereinafter OBN), which is a DC voltage 28-volt network and/or a network of which the voltage is provided by an appropriate power electronics unit connected to a compatible AC voltage of the aircraft. It has also been proposed to use an electric machine to mechanically assist the turboshaft engine during a specific standby mode.

The inventors have therefore sought to improve the performance of the architectures of propulsion systems comprising at least one turboshaft engine suitable for being put in standby mode and a system for reactivating the turboshaft engine comprising an electric machine.

In particular, the inventors have sought to propose a new propulsion system architecture that allows a very good level of availability of the reactivation system to be obtained. The inventors have also sought to propose a new architecture that allows any failures in the system for reactivating the turboshaft engine on standby to be detected.

SUMMARY

Embodiments of the disclosure aim to provide a new architecture of the propulsion system of a multi-engine helicopter.

The disclosure also aims to provide, at least in one embodiment, an architecture of a propulsion system of a multi-engine helicopter comprising a turboshaft engine configured to be capable of being put on standby and a reactivation system that has an improved availability in comparison with the systems from the prior art.

The disclosure also aims to provide, at least in one embodiment, an architecture that allows any failures in the reactivation system to be detected.

The disclosure also aims to provide a helicopter comprising a propulsion system that has an architecture according to the disclosure.

In order to achieve this, the disclosure relates to an architecture of a propulsion system of a multi-engine helicopter comprising turboshaft engines connected to a power transmission gearbox, characterized in that it comprises:

at least one turboshaft engine among the turboshaft engines, referred to as a hybrid turboshaft engine, capable of operating in at least one standby mode during a stable flight of the helicopter, the other turboshaft engines operating alone during this stable flight, at least two systems for controlling each hybrid turboshaft engine, referred to as reactivation systems, each system comprising an electric machine connected to the hybrid turboshaft engine and designed to be capable of rotating the hybrid turboshaft engine, and at least one source of electrical power for the electric machine, each reactivation system being configured such that it can drive the turboshaft engine in at least one operating mode among a plurality of predetermined modes.

An architecture according to the disclosure therefore makes it possible to at least duplicate the systems for reactivating a hybrid turboshaft engine capable of operating in a standby mode. The reactivation system of an architecture according to the disclosure therefore comprises at least two separate electric machines, each machine being connected to the hybrid turboshaft engine so as to form at least two separate reactivation systems configured to be capable of driving the turboshaft engine towards at least one operating mode selected from a plurality of predetermined modes.

A hybrid turboshaft engine within the meaning of the disclosure is a turboshaft engine configured to be capable of being put, on demand and deliberately, in at least one predetermined standby mode, from which it can exit in a normal or rapid (also referred to as emergency) manner. A turboshaft engine can be in standby mode only during a stable flight of the helicopter, i.e. when no turboshaft engine of the helicopter has failed, during a cruise flight situation, when it is progressing in normal conditions. The exit from standby mode consists in changing the turboshaft engine into a gas generator acceleration mode by means of driving in a manner that is compatible with the exit mode required by the conditions (normal standby-exiting mode or rapid standby-exiting mode, also referred to as emergency exit).

Advantageously and according to the disclosure, given that the turboshaft engine comprising a gas generator, the plurality of predetermined modes comprises:

a mode, referred to as the rapid reactivation mode, in which the turboshaft engine is rotated from the standby mode up to a speed in the range of between 80 and 105% of the nominal speed of the gas generator of the turboshaft engine in a period of less than 10 seconds;

a mode, referred to as the normal reactivation mode, in which the turboshaft engine is rotated from the standby mode up to a speed in the range of between 80 and 105% of the nominal speed of the gas generator of the turboshaft engine in a period in the range of between 10 seconds and 60 seconds;

a standby mode, referred to as the assisted super-idle mode, in which the turboshaft engine is continuously rotated at a speed in the range of between 20 and 60% of the nominal speed of the gas generator of the turboshaft engine;

a standby mode, referred to as the turning mode, in which the turboshaft engine is continuously rotated at a speed in the range of between 5 and 20% of the nominal speed of the gas generator of the turboshaft engine.

Advantageously and according to the disclosure, given that the helicopter comprising at least one onboard network, each reactivation system configured to drive the turboshaft engine in the rapid reactivation mode comprises a source of electrical power formed by an energy storage unit; and each reactivation system configured to drive the turboshaft engine in the normal reactivation mode or a standby mode comprises a source of electrical power formed by an onboard network of the helicopter.

An energy storage unit makes it possible to supply a significant amount of power compatible with the energy required for the turboshaft engine to exit its standby mode rapidly. The storage unit is therefore very suitable for the reactivation system intended for the rapid reactivation of the turboshaft engine.

The onboard network allows the corresponding reactivation system to be tested, both on the ground before takeoff and during flight, for example before the turboshaft engine is put on standby. In addition, such a source of energy is sufficient to supply power to an electric machine intended to restart the hybrid turboshaft engine under normal reactivation conditions.

Advantageously and according to the disclosure, the onboard network is a network configured to supply a compatible AC voltage of the aircraft.

According to a first advantageous variant of the disclosure, the architecture comprises:

at least one first reactivation system configured to be capable of driving the turboshaft engine in the rapid reactivation mode, the normal reactivation mode and at least one standby mode;

at least one second reactivation system configured to be capable of driving the turboshaft engine solely in the normal reactivation mode.

In order to do this, in practice, the first system is connected to two separate sources of electrical energy, namely an energy storage unit and the onboard network of the helicopter. The second system is also connected to the onboard network.

According to this variant, the first and the second reactivation systems are both compatible with a normal reactivation of the turboshaft engine. They can therefore be called upon alternately at each start-up in order to check their availability.

The first reactivation system is in addition configured for both a rapid reactivation and a standby mode. Therefore, during the standby mode, the system is called upon, which acts as a test of the system, in readiness for any rapid reactivation. The absence of any malfunction in the system is thus checked during the standby mode.

In the event that the first system is unavailable, the second system is called upon for a normal reactivation of the hybrid turboshaft engine.

During a rapid reactivation of the hybrid turboshaft engine, the first system is called upon and the second system is able to provide additional power if necessary.

In combination with the first variant, the second system can also be configured to be capable of driving the turboshaft engine in the rapid reactivation mode. In order to do this, the second system is, in practice, connected to a second electrical energy storage unit.

An architecture according to this particular variant therefore has available two separate reactivation systems allowing the turboshaft engine to be restarted rapidly. Thus, in the event of a failure of one rapid reactivation system, the other system can compensate for the failure.

According to a second advantageous variant of the disclosure, the architecture comprises:

at least one first reactivation system configured to be capable of driving the turboshaft engine in both the rapid reactivation mode and the normal reactivation mode;

at least one second reactivation system configured to be capable of driving the turboshaft engine solely in the standby mode.

In order to do this, in practice, the first reactivation system comprises two sources of electrical power, namely an energy storage unit and the onboard network of the helicopter, and the second reactivation system is connected directly to the onboard network.

The first system is called upon at start-up in order to check the availability of the system. In standby mode, the second system is called upon in order to avoid producing wear in the system allocated to rapid reactivation. Any unavailability of the second system results in a switchover to the first system and in the reactivation of the turboshaft engine.

In combination with this second variant, the second system can also be configured to be capable of driving the turboshaft engine in the normal reactivation mode. In order to do this, the second system is connected to the onboard network.

This variant is advantageous particularly in that in the event of a failure of the first system, the second system can provide normal reactivation of the turboshaft engine.

In addition, the two systems can be tested at any moment.

The disclosure also relates to a helicopter comprising a propulsion system, characterized in that the propulsion system has an architecture according to the disclosure.

The disclosure also relates to an architecture of a propulsion system of a multi-engine helicopter and to a helicopter provided with a propulsion system having such an architecture, these being characterized in combination by all or some of the features mentioned above or below.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The embodiments described below are some examples for carrying out the disclosure. Although the detailed description refers to one or more embodiments, this does not necessarily mean that each reference relates to the same embodiment, or that the features apply only to a single embodiment. Individual features of different embodiments can also be combined in order to provide other embodiments. In addition, in the FIGURES, for the purposes of illustration and clarity, the scales and the proportions are not necessarily accurate.

Figure 1:
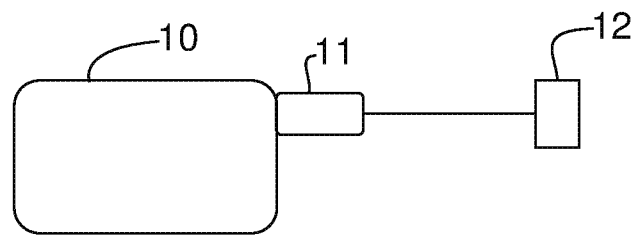
FIG. 1 is a schematic view of an architecture from the prior art comprising a turboshaft engine controlled by a single control system.

FIG. 1 is a schematic view of an architecture of a known helicopter propulsion system comprising a turboshaft engine 10 and a system for controlling the turboshaft engine. The control system comprises an electric machine 11 suitable for rotating the turboshaft engine 10 on demand so as to ensure the start-up thereof. The electric machine 11 draws its power directly from a low-voltage onboard network 12 of the helicopter, which is typically a network that supplies a 28-volt DC voltage.

Figure 2:
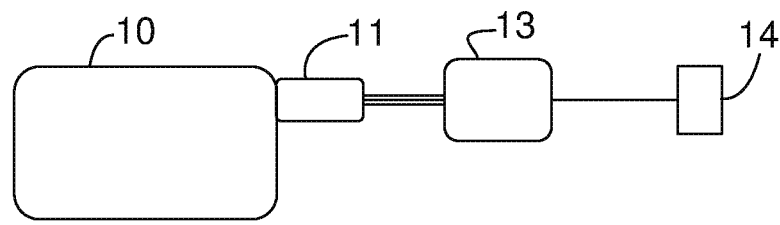
FIG. 2 is a schematic view of another architecture from the prior art.

FIG. 2 is a schematic view of an architecture of a known helicopter propulsion system comprising the turboshaft engine 10 and another system for controlling the turboshaft engine. The control system comprises an electric machine 11 suitable for rotating the turboshaft engine 10 on demand so as to ensure the start-up thereof. The electric machine 11 draws its power from a compatible high AC-voltage onboard network 14 of the aircraft. The control system also comprises a power conversion module 13 designed to convert the high AC voltage supplied by the onboard network 14 into a voltage for controlling the electric machine 11.

The turboshaft engine 10 having the architectures from FIGS. 1 and 2 is generally started on the ground. An in-flight restart of a turboshaft engine according to this architecture is an exceptional event.

FIGS. 3 to 7 show architectures according to the disclosure that allow at least one turboshaft engine to be put on standby and to be reactivated during flight. In addition, the proposed architectures make the reactivation operations reliable and allow the different reactivation systems to be tested regularly.

In FIGS. 3 to 7, only the hybrid turboshaft engine is shown, it being understood that in a multi-engine architecture, in particular a twin-engine or three-engine architecture, the architecture comprises a plurality of turboshaft engines of which at least one is a hybrid turboshaft engine.

Figure 8:
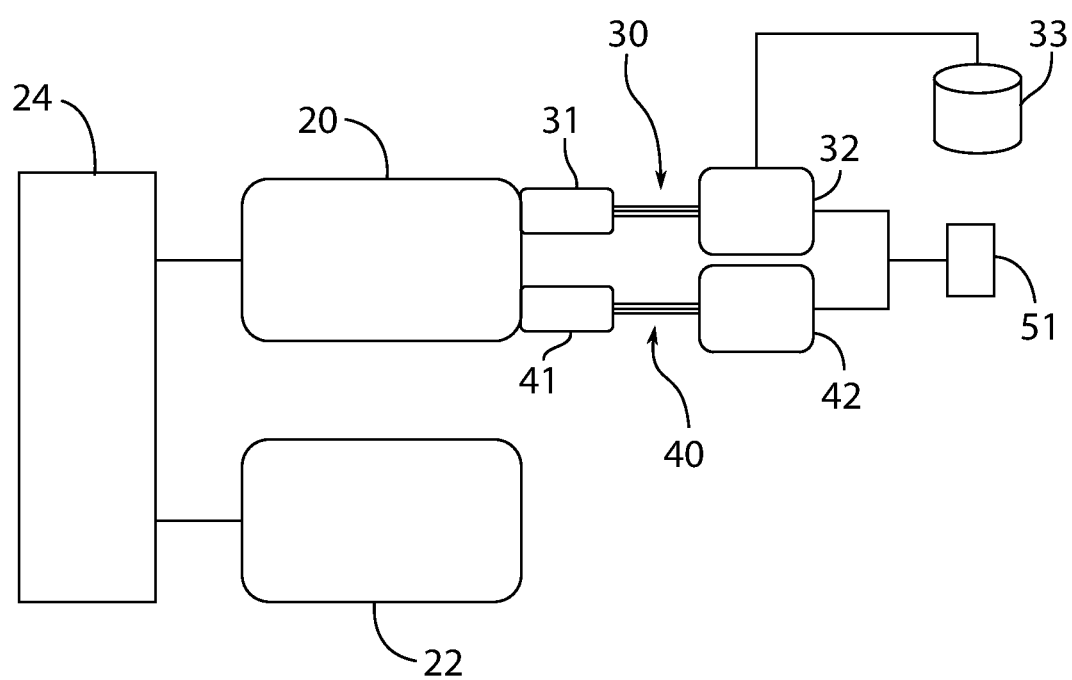
FIG. 8 is a schematic view of an architecture according to another embodiment of the disclosure.

An architecture according to the disclosure comprises a plurality of turboshaft engines 20, 22 connected to a power transmission gearbox 24, as shown in FIG. 8.

Among the plurality of turboshaft engines, at least one turboshaft engine, referred to as a hybrid turboshaft engine 20, is capable of operating in at least one standby mode during a cruise flight of the helicopter.

According to the embodiments shown in FIGS. 3 to 7, the architecture comprises two systems 30, 40 for reactivating the hybrid turboshaft engine 20. In the whole of the following, the reactivation system denoted by reference numeral 30 will be referred to as the first reactivation system and the reactivation system denoted by reference numeral 40 will be referred to as the second reactivation system.

It is also hereby specified that the same reference numerals 30 and 40 are used to indicate the first and second reactivation systems in FIGS. 3 to 7, even though the reactivation systems may not be the same from one embodiment to another.

Each reactivation system 30, 40 is configured to be capable of driving the turboshaft engine 20 in at least one operating mode among a plurality of predetermined modes.

In light of the turboshaft engine comprising a gas generator, the predetermined modes comprise at least the following modes:

a mode, referred to as the rapid reactivation mode, in which the turboshaft engine 20 is rotated from the standby mode up to a speed in the range of between 80 and 105% of the nominal speed of the gas generator of the turboshaft engine within a period of less than 10 seconds;

a mode, referred to as the normal reactivation mode, in which the turboshaft engine 20 is rotated from the standby mode up to a speed in the range of between 80 and 105% of the nominal speed of the gas generator of the turboshaft engine within a period in the range of between 10 seconds and 60 seconds;

a standby mode, referred to as the assisted super-idle mode, in which the turboshaft engine 20 is continuously rotated at a speed in the range of between 20 and 60% of the nominal speed of the gas generator of the turboshaft engine;

a standby mode, referred to as the turning mode, in which the turboshaft engine 20 is continuously rotated at a speed in the range of between 5 and 20% of the nominal speed.

Figure 3:
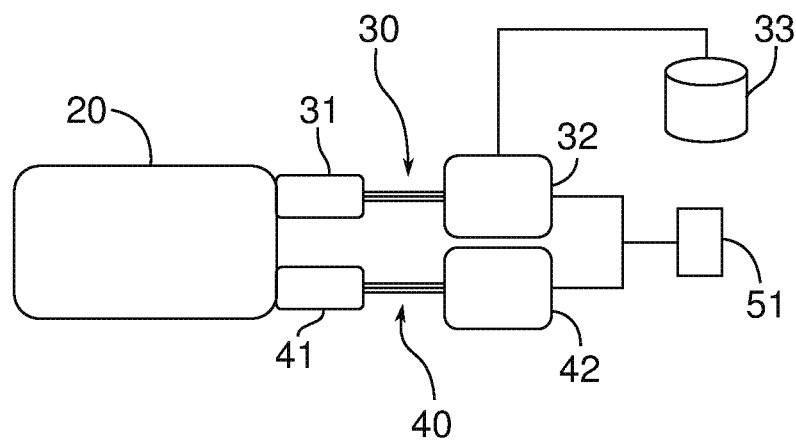
FIG. 3 is a schematic view of an architecture according to an embodiment of the disclosure.

In FIG. 3, the first reactivation system 30 comprises an electric machine 31, a power conversion device 32, an electrical energy storage unit 33, and an onboard network 51. The second reactivation system 40 comprises an electric machine 41, a power conversion device 42 and an onboard network 51, which is shared with the first reactivation system 30.

This embodiment allows the first reactivation system 30 to drive the turboshaft engine 20 in any of the rapid reactivation mode (by the use of the energy from the storage unit 33), the normal reactivation mode (by the use of the energy from the onboard network 51 or from the storage unit 33), or at least one standby mode (by the use of the energy from the onboard network 51). It also allows the second reactivation system 40 to be capable of driving the turboshaft engine 20 in the normal reactivation mode (by the use of the energy from the onboard network 51).

According to this embodiment, the first and second systems can be called upon alternately at each start-up to check their availability.

Since the first system is also configured for a rapid reactivation and a standby mode, the transition of the turboshaft engine 20 into standby mode allows the integrity of the system 30 to be tested and therefore any malfunction then preventing rapid reactivation of the turboshaft engine 20 by the system 30 to be detected. In the event of a malfunction being detected, the second system 40 is then called upon for a normal reactivation of the hybrid turboshaft engine 20.

During a rapid reactivation of the hybrid turboshaft engine 20 by the first reactivation system 30, the second system 40 can also potentially provide additional power if necessary.

Figure 4:
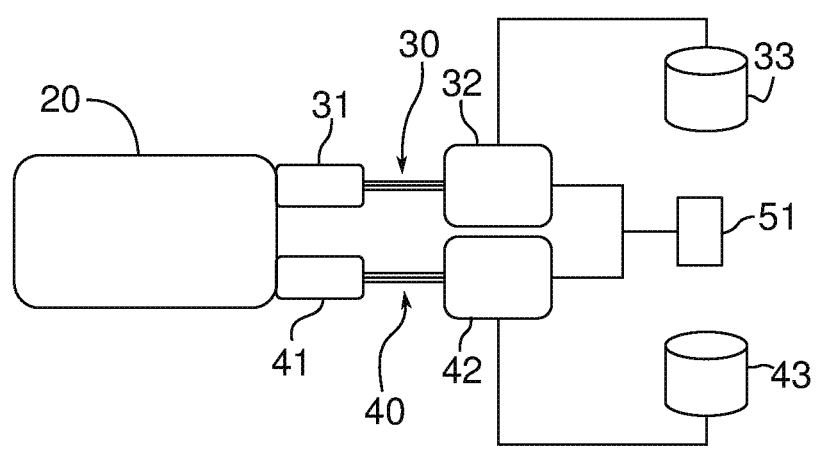
FIG. 4 is a schematic view of an architecture according to another embodiment of the disclosure.

The architecture shown in FIG. 4 is a variant of that shown in FIG. 3. This architecture comprises, in addition to the elements described in relation to FIG. 3, a second storage unit 43 arranged in the second reactivation system 40.

This embodiment therefore allows the second reactivation system 40 to also drive the turboshaft engine 20 in the rapid reactivation mode (by the use of the energy from the storage unit 43).

This architecture is therefore redundant and has a high degree of availability.

Figure 5:
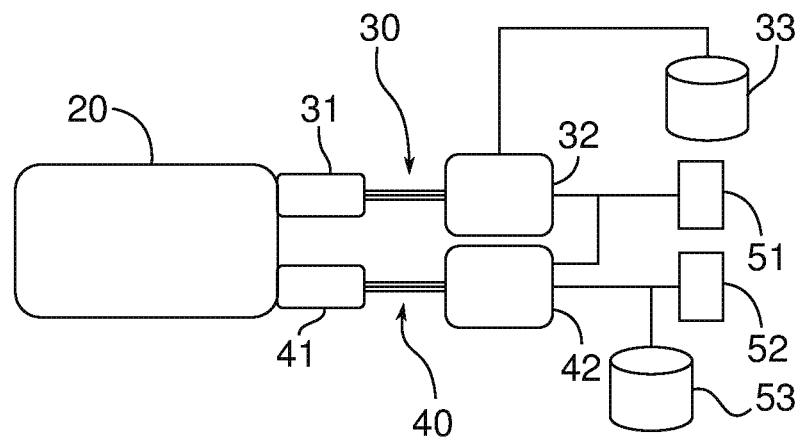
FIG. 5 is a schematic view of an architecture according to another embodiment of the disclosure.

In FIG. 5, the first reactivation system 30 comprises an electric machine 31, a power conversion device 32, an electrical energy storage unit 33, and an onboard network 51 that is, for example, an onboard network supplying an AC voltage of 115 volts. The second reactivation system 40 comprises an electric machine 41, a power conversion device 42, an onboard network 52 that is, for example, a network supplying a DC voltage of 28 volts, the onboard network 51 shared with the first reactivation system 30, and optionally an electrical energy storage unit 53.

In this embodiment, the first reactivation system 30 allows the turboshaft engine 20 to be driven in the rapid reactivation mode (by the use of the energy from the storage unit 33), in the normal reactivation mode (by the use of the energy from the onboard network 51 or from the storage unit 33) or in a standby mode. It also allows the second reactivation system 40 to be capable of driving the turboshaft engine 20 in a normal reactivation mode (by the use of the energy from the onboard network 52 or from the optional storage unit 53 or by the energy from the onboard network 51). In particular, this particular configuration allows the second system 40 for reactivating the turboshaft engine 20 to use the onboard network 51 for high power levels, for example levels greater than 10 kW, and to use the onboard network 52 for lower power levels, for example levels below 10 kW.

Figure 6:
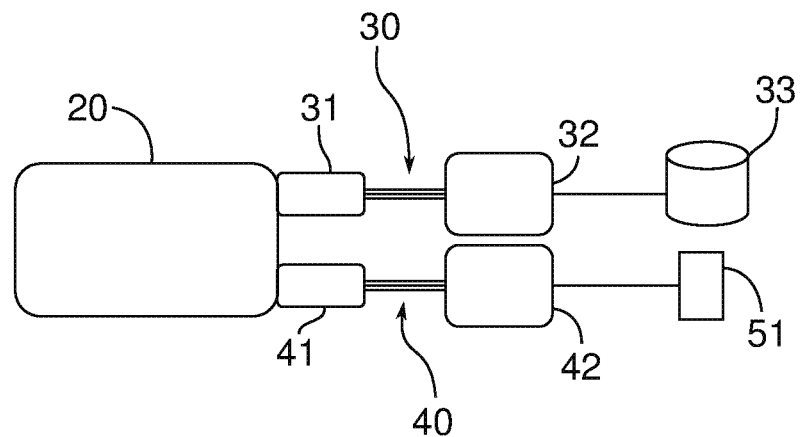
FIG. 6 is a schematic view of an architecture according to another embodiment of the disclosure.

In FIG. 6, the first reactivation system 30 comprises an electric machine 31, a power conversion device 32 and an electrical energy storage unit 33. The second reactivation system 40 comprises an electric machine 41, a power conversion device 42 and an onboard network 51.

In this embodiment, the first reactivation system 30 allows the turboshaft engine 20 to be driven in the rapid reactivation mode (by the use of the energy from the storage unit 33). It also allows the second reactivation system 40 to be capable of driving the turboshaft engine 20 in a standby mode (by the use of the energy from the onboard network 51) or in a normal reactivation mode.

Figure 7:
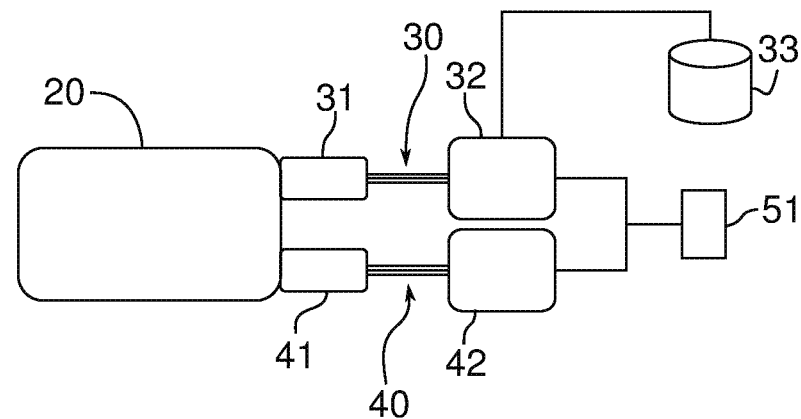
FIG. 7 is a schematic view of an architecture according to another embodiment of the disclosure.

In FIG. 7, the first reactivation system 30 comprises an electric machine 31, a power conversion device 32, an electrical energy storage unit 33, and an onboard network 51. The second reactivation system 40 comprises an electric machine 41, a power conversion device 42 and the onboard network 51, shared with the first system 30.

In this embodiment, the first reactivation system 30 allows the turboshaft engine 20 to be driven in the rapid reactivation mode (by the use of the energy from the storage unit 33) and in the normal reactivation mode (by the use of the energy from the onboard network 51 or from the storage unit 33). It also allows the second reactivation system 40 to be capable of driving the turboshaft engine 20 in a standby mode or in a normal reactivation mode (by the use of the energy from the onboard network 51).

In a variant, the second system can be configured to drive the turboshaft engine 20 solely in a standby mode (by the use of the energy from the onboard network 51).

The advantage of this architecture is the ability to use power-optimized electric machines, in particular for the electric machine 41, the only function of which is to provide the standby mode.

For each mode, the control of the reactivation systems is governed by the turboshaft engine control system known by the acronym FADEC, for Full Authority Digital Engine Control.

The disclosure is not limited solely to the embodiments described. In particular, the disclosure may comprise a plurality of hybrid turboshaft engines, each turboshaft engine being provided with at least two reactivation systems of its own as described.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for reactivating a hybrid turboshaft engine, said hybrid turboshaft engine being comprised in an architecture of a propulsion system of a multi-engine helicopter, said architecture having turboshaft engines connected to a power transmission gearbox, said hybrid turboshaft engine being capable of operating in at least one standby mode during a stable cruise flight of the helicopter and a second turboshaft engine operating during the stable cruise flight,
   said architecture further comprising at least a first reactivation system and a second reactivation system configured to control the hybrid turboshaft engine, each reactivation system comprising an electric machine connected to the hybrid turboshaft engine for rotating said hybrid turboshaft engine, and at least one source of electrical power for said electric machine,
said method comprising:
   driving the hybrid turboshaft engine in a rapid reactivation mode, wherein said hybrid turboshaft engine is rotated at a speed of 105% of a nominal speed of a gas generator of said hybrid turboshaft engine in a period of less than 10 seconds;
   driving the hybrid turboshaft engine in a normal reactivation mode, wherein said hybrid turboshaft engine is rotated to a speed in the range of between 80% and 105% of the nominal speed of the gas generator of said hybrid turboshaft engine in a period in the range of between 10 seconds and 60 seconds;
   driving the hybrid turboshaft engine in an assisted super-idle standby mode, in which the hybrid turboshaft engine is rotating to a speed in the range of between 20% and 60% of the nominal speed of the gas generator of said hybrid turboshaft engine;
   driving the hybrid turboshaft engine in a turning standby mode, in which the gas generator of said hybrid turboshaft engine is rotating to a speed in the range of between 5% and 20% of the nominal speed of the gas generator of said hybrid turboshaft engine,
   said first reactivation system being configured to drive said hybrid turboshaft engine in the rapid reactivation mode, the normal reactivation mode, and at least one of the assisted super-idle standby mode or the turning standby mode; and
   said second reactivation system being configured to drive said hybrid turboshaft engine in said normal reactivation mode.

2. A method for reactivating a hybrid turboshaft engine, said hybrid turboshaft engine being comprised in an architecture of a propulsion system of a multi-engine helicopter, said architecture having turboshaft engines connected to a power transmission gearbox, said hybrid turboshaft engine being capable of operating in at least one standby mode during a stable cruise flight of the helicopter and a second turboshaft engine operating during the stable cruise flight,
   said architecture further comprising at least a first reactivation system and a second reactivation system configured to control the hybrid turboshaft engine, each reactivation system comprising an electric machine connected to the hybrid turboshaft engine for rotating said hybrid turboshaft engine, and at least one source of electrical power for said electric machine,
said method comprising:
   driving the hybrid turboshaft engine in a rapid reactivation mode, wherein said hybrid turboshaft engine is rotated up to a speed greater in the range of between 80% and 105% of a nominal speed of a gas generator of said hybrid turboshaft engine in a period of less than 10 seconds;
   driving the hybrid turboshaft engine in a normal reactivation mode, wherein said hybrid turboshaft engine is rotated at the speed of 105% of the nominal speed of the gas generator of said hybrid turboshaft engine in a period in the range of between 10 seconds and 60 seconds;
   driving the hybrid turboshaft engine in an assisted super-idle standby mode, in which the hybrid turboshaft engine is rotating up to a speed in the range of between 20% and 60% of the nominal speed of the gas generator of said hybrid turboshaft engine;
   driving the hybrid turboshaft engine in a turning standby mode, in which the gas generator of said hybrid turboshaft engine is rotating up to a speed in the range of between 5% and 20% of the nominal speed of the gas generator of said hybrid turboshaft engine,
   said first reactivation system being configured to drive said hybrid turboshaft engine in the rapid reactivation mode, the normal reactivation mode, and at least one of the assisted super-idle standby mode or the turning standby mode; and
   said second reactivation system being configured to drive said hybrid turboshaft engine in said normal reactivation mode.

3. A method for reactivating a hybrid turboshaft engine, said hybrid turboshaft engine being comprised in an architecture of a propulsion system of a multi-engine helicopter, said architecture having turboshaft engines connected to a power transmission gearbox, said hybrid turboshaft engine being capable of operating in at least one standby mode during a stable cruise flight of the helicopter and a second turboshaft engine operating during the stable cruise flight,
   said architecture further comprising at least a first reactivation system and a second reactivation system configured to control the hybrid turboshaft engine, each reactivation system comprising an electric machine connected to the hybrid turboshaft engine for rotating said hybrid turboshaft engine, and at least one source of electrical power for said electric machine,
said method comprising:
   driving the hybrid turboshaft engine in a rapid reactivation mode, wherein said hybrid turboshaft engine is rotated up to a speed greater in the range of between 80% and 105% of a nominal speed of a gas generator of said hybrid turboshaft engine in a period of less than 10 seconds;
   driving the hybrid turboshaft engine in a normal reactivation mode, wherein said hybrid turboshaft engine is rotated up to a speed in the range of between 80% and 105% of the nominal speed of the gas generator of said hybrid turboshaft engine in a period in the range of between 10 seconds and 60 seconds;
   driving the hybrid turboshaft engine in an assisted super-idle standby mode, in which the hybrid turboshaft engine is rotating at the speed of 60% of the nominal speed of the gas generator of said hybrid turboshaft engine;

driving the hybrid turboshaft engine in a turning standby mode, in which the gas generator of said hybrid turboshaft engine is rotating up to a speed in the range of between 5% and 20% of the nominal speed of the gas generator of said hybrid turboshaft engine, said first reactivation system being configured to drive said hybrid turboshaft engine in the rapid reactivation mode, the normal reactivation mode, and at least one of the assisted super-idle standby mode or the turning standby mode; and said second reactivation system being configured to drive said hybrid turboshaft engine in said normal reactivation mode.

4. A method for reactivating a hybrid turboshaft engine, said hybrid turboshaft engine being comprised in an architecture of a propulsion system of a multi-engine helicopter, said architecture having turboshaft engines connected to a power transmission gearbox, said hybrid turboshaft engine being capable of operating in at least one standby mode during a stable cruise flight of the helicopter and a second turboshaft engine operating during the stable cruise flight, said architecture further comprising at least a first reactivation system and a second reactivation system configured to control the hybrid turboshaft engine, each reactivation system comprising an electric machine connected to the hybrid turboshaft engine for rotating said hybrid turboshaft engine, and at least one source of electrical power for said electric machine, said method comprising:

driving the hybrid turboshaft engine in a rapid reactivation mode, wherein said hybrid turboshaft engine is rotated up to a speed greater in the range of between 80% and 105% of a nominal speed of a gas generator of said hybrid turboshaft engine in a period of less than 10 seconds;

driving the hybrid turboshaft engine in a normal reactivation mode, wherein said hybrid turboshaft engine is rotated up to a speed in the range of between 80% and 105% of the nominal speed of the gas generator of said hybrid turboshaft engine in a period in the range of between 10 seconds and 60 seconds;

driving the hybrid turboshaft engine in an assisted super-idle standby mode, in which the hybrid turboshaft engine is rotating up to a speed in the range of between 20% and 60% of the nominal speed of the gas generator of said hybrid turboshaft engine;

driving the hybrid turboshaft engine in a turning standby mode, in which the gas generator of said hybrid turboshaft engine is rotating at the speed of 20% of the nominal speed of the gas generator of said hybrid turboshaft engine, said first reactivation system being configured to drive said hybrid turboshaft engine in the rapid reactivation mode, the normal reactivation mode, and at least one of the assisted super-idle standby mode or the turning standby mode; and said second reactivation system being configured to drive said hybrid turboshaft engine in said normal reactivation mode.

5. A method for reactivating a hybrid turboshaft engine, said hybrid turboshaft engine being comprised in an architecture of a propulsion system of a multi-engine helicopter, said architecture having turboshaft engines connected to a power transmission gearbox, said hybrid turboshaft engine being capable of operating in at least one standby mode during a stable cruise flight of the helicopter and a second turboshaft engine operating during the stable cruise flight, said architecture further comprising at least a first reactivation system and a second reactivation system configured to control the hybrid turboshaft engine, each reactivation system comprising an electric machine connected to the hybrid turboshaft engine for rotating said hybrid turboshaft engine, and at least one source of electrical power for said electric machine, said method comprising:

driving the hybrid turboshaft engine in a rapid reactivation mode, wherein said hybrid turboshaft engine is rotated at the speed of 105% of a nominal speed of a gas generator of said hybrid turboshaft engine in a period of less than 10 seconds;

driving the hybrid turboshaft engine in a normal reactivation mode, wherein said hybrid turboshaft engine is rotated at the speed of 105% of the nominal speed of the gas generator of said hybrid turboshaft engine in a period in the range of between 10 seconds and 60 seconds;

driving the hybrid turboshaft engine in an assisted super-idle standby mode, in which the hybrid turboshaft engine is rotating at the speed of 60% of the nominal speed of the gas generator of said hybrid turboshaft engine;

driving the hybrid turboshaft engine in a turning standby mode, in which the gas generator of said hybrid turboshaft engine is rotating at the speed of 20% of the nominal speed of the gas generator of said hybrid turboshaft engine, said first reactivation system being configured to drive said hybrid turboshaft engine in the rapid reactivation mode, the normal reactivation mode, and at least one of the assisted super-idle standby mode or the turning standby mode; and said second reactivation system being configured to drive said hybrid turboshaft engine in said normal reactivation mode.

* * * * *